Figure 1:
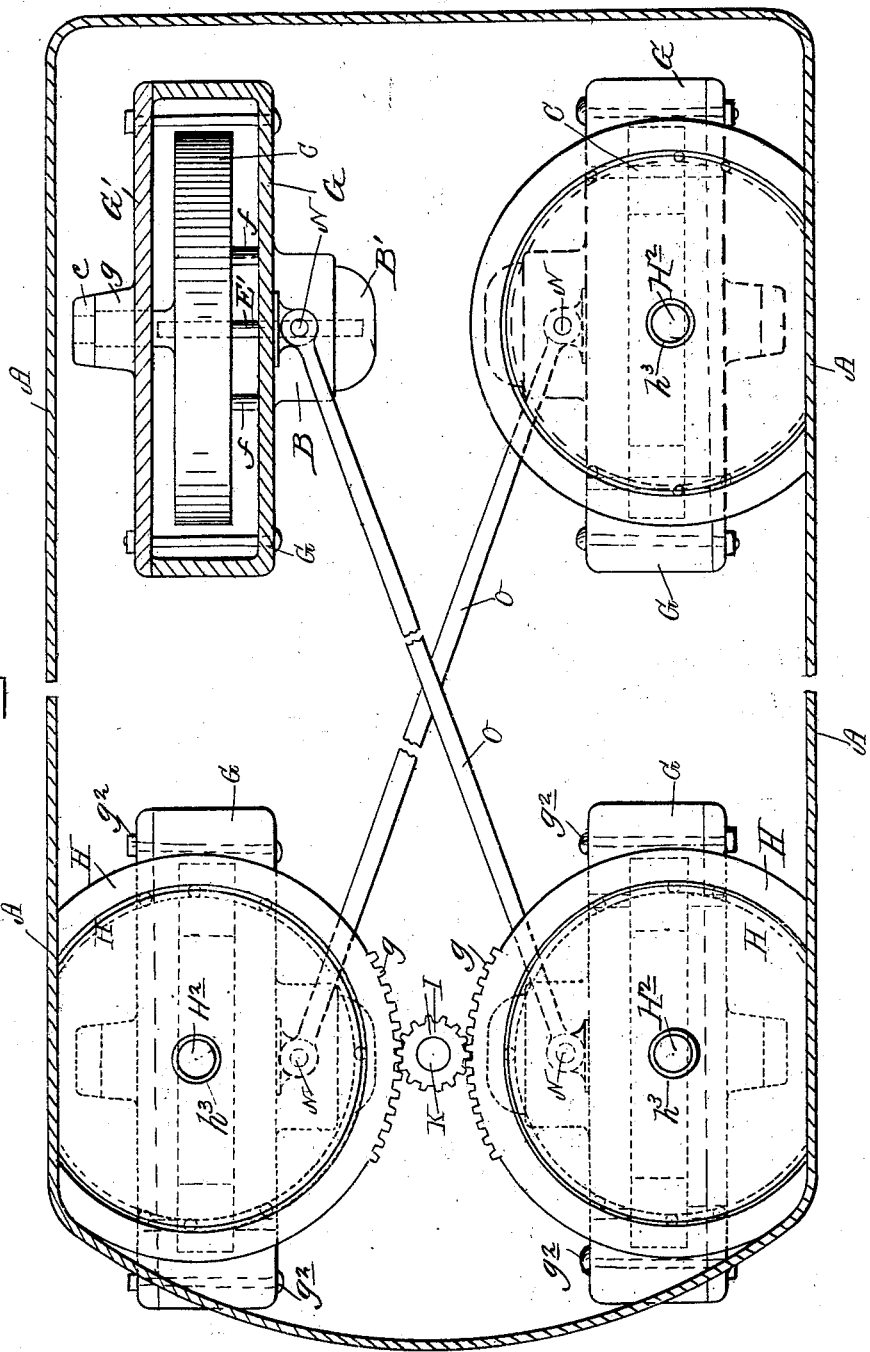

No. 693,994. Patented Feb. 25, 1902.
W. BOWKER, Sr.
RUNNING AND STEERING GEAR FOR MOTOR VEHICLES.
(Application filed June 22, 1901. Renewed Jan. 30, 1902.)
(No Model.) 3 Sheets—Sheet 1.

Witnesses.
Lauritz W. Möller
W. W. Gruble

Inventor.
Wm. Bowker, Sr.
by Geo. E. Evans
atty

No. 693,994. Patented Feb. 25, 1902.
W. BOWKER, Sr.
RUNNING AND STEERING GEAR FOR MOTOR VEHICLES.
(Application filed June 22, 1901. Renewed Jan. 30, 1902.)
(No Model.) 3 Sheets—Sheet 2.
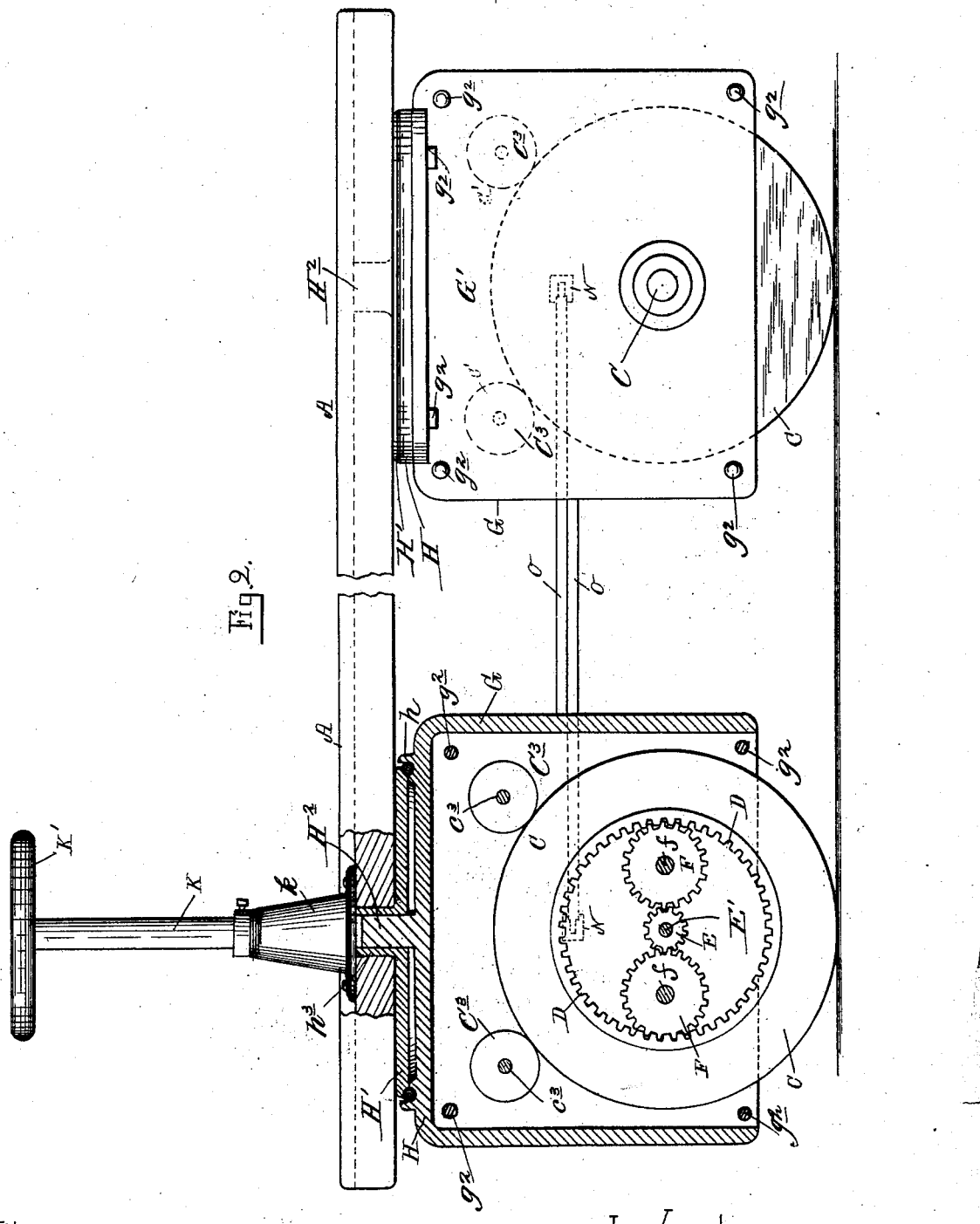
Witnesses.
Inventor.
Wm Bowker Sr.
by Geo. H. Evans
atty No. 693,994. Patented Feb. 25, 1902.
W. BOWKER, Sr.
RUNNING AND STEERING GEAR FOR MOTOR VEHICLES.
(Application filed June 22, 1901. Renewed Jan. 30, 1902.)
(No Model.) 3 Sheets—Sheet 3.
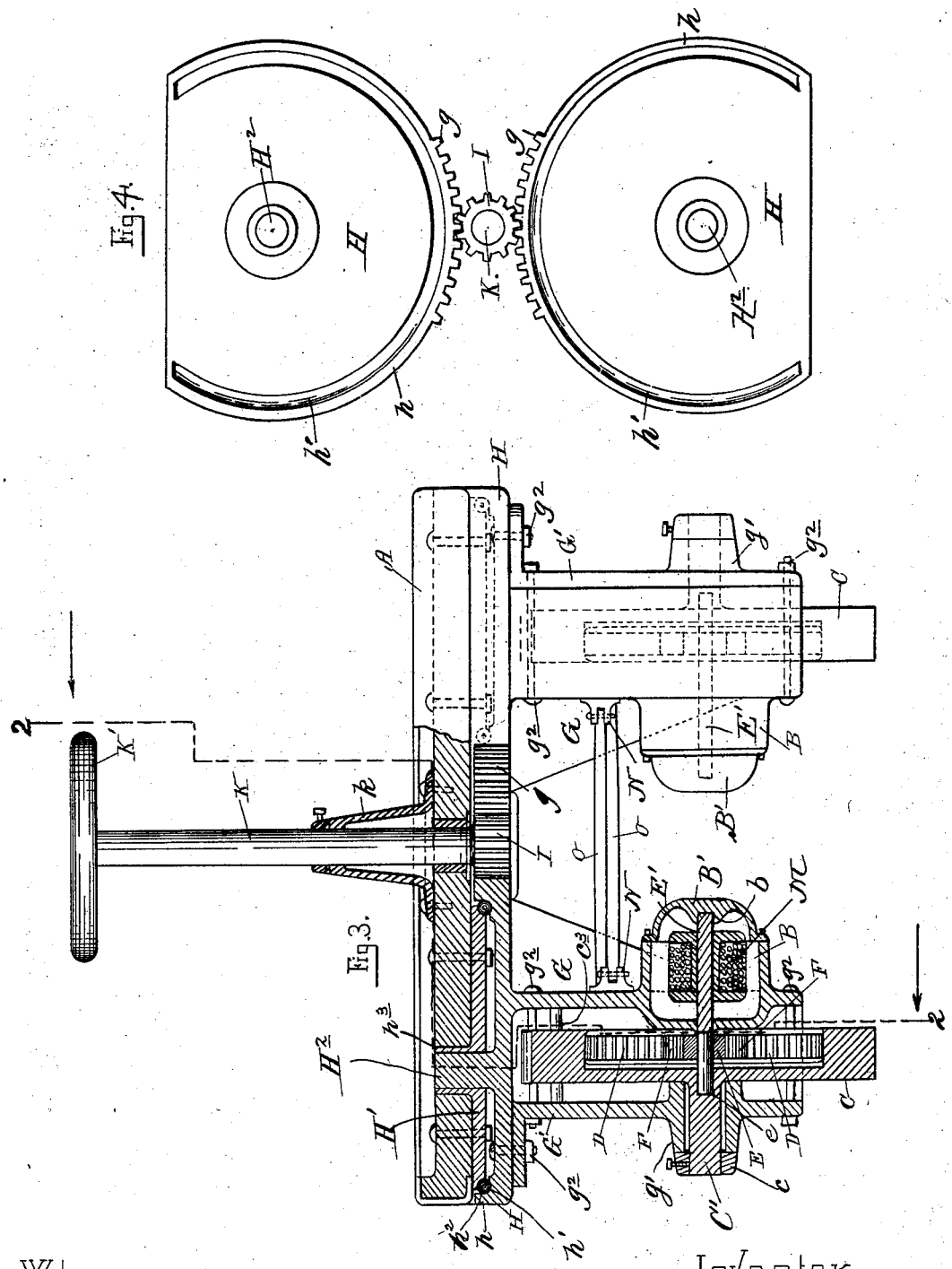
Witnesses.
Lauritz N. Möller
W. T. Grebb
Inventor.
Wm Bowker Sr.
by Geo. K. Evans
atty

UNITED STATES PATENT OFFICE.

WILLIAM BOWKER, SR., OF WALTHAM, MASSACHUSETTS.

RUNNING AND STEERING GEAR FOR MOTOR-VEHICLES.

SPECIFICATION forming part of Letters Patent No. 693,994, dated February 25, 1902.

Application filed June 22, 1901. Renewed January 30, 1902. Serial No. 91,890. (No model.)

*To all whom it may concern:*

Be it known that I, WILLIAM BOWKER, Sr., a citizen of the United States, residing at Waltham, Middlesex county, Massachusetts, have invented certain new and useful Improvements in Running and Steering Gear for Motor-Vehicles, of which the following is a specification.

The invention relates to the class of vehicles known as "motor-vehicles."

The objects of the invention are to provide such a vehicle with a series of pivoted horizontally-turning wheel-carrying frames carrying the motors for the wheels journaled in said frames, also to connect the said frames for simultaneous operation by a steering shaft or lever, and also to drive the wheels from the motor-shafts through the medium of a pinion on each shaft meshing into a gear pivoted on the wheel-frame, said gear in turn meshing into an internally-toothed gear on the wheel. These and other objects are accomplished by the mechanism shown in the accompanying drawings, in which—

Figure 1 is a plan of my improved running and steering gear, the platform being removed save at its margin and the rear right-hand wheel-carrying frame being in section. Fig. 2 is a side elevation, partly in section on line 2 2 of Fig. 3. Fig. 3 is a front end view with parts in section. Fig. 4 is a plan of the upper ends of the front wheel-carrying frames and the steering-pinion.

A designates the vehicle body or platform, of any suitable construction, supported upon four driven wheels C C C C. These four wheels are mounted in horizontally-turning wheels and motor-carrying frames G, the two front frames being provided at the adjacent portions of their upper circular edges with gear-teeth $g$, into which meshes the steering-pinion I on the lower end of the vertical steering-shaft K, journaled in the bearing $k$, bolted to the platform A, as shown in Figs. 2 and 3. The upper end of the shaft K is provided with a hand-wheel K'.

As the wheel and motor carrying frames are all alike, except that the two rear ones do not have the toothed portions $g$ $g$, a description of one of them will be sufficient and is as follows:

The frame G comprises a hollow oblong box-like structure open at its lower end, through which the wheel projects, and the outer movable side G' of the wheel-frame is provided with a journal-bearing $g'$, in which is mounted the journal C' on the outer side of the wheel. The journal is provided on its outer end with a securing-collar $c$ or other means of holding it in place. The removable outer side or plate G' is held in place by the bolts $g^2$. The top plate or turn-table H of the wheel-carrying frame G is made circular, but flattened at its outer edge, and on the upper side the top plate is provided with a raised marginal flange $h$, in the inner angle of which is formed a raceway or groove $h'$, in which are placed the antifriction-balls $h^2$, held in place by the cover-plate H', bolted to the under side of the platform. (See Fig. 3.) The cover-plate H' has a central tubular bearing $h^3$, into which projects the vertical pivot or pintle H², extending from the circular plate or turn-table H and forming the axis on which the wheel-carrying frame turns.

The wheel C on its inner face is provided with a recess having the internal annular gear-teeth D, into which mesh the two pinions F F, mounted on the studs $f$ $f$, projecting from the inner wall of the frame G. These pinions F F are in mesh with and driven from the intermediate pinion E, secured to the motor-shaft E'. This motor-shaft extends through a motor-box B, formed or secured on the outer face of the inner side of the wheel-carrying frame G (see Fig. 3) and at its inner end is mounted in a bearing $e$ in the center of wheel C, the outer end of the shaft being journaled in a bearing $b$, formed on the inner face of the removable cover B' of the motor-box B. The shaft E is driven by an electric motor M, mounted on it within the box B and deriving its power from any suitable source.

In order to relieve the journal C' of the weight, I provide the two supporting-rollers C³, which are mounted on axes $c^3$ in the frame G and on which the upper edge of the wheel C bears at opposite sides of a vertical line through its journal.

In order that all four wheels C may act as steering-wheels, I connect diagonally opposite wheels by the crossed rods O O, the ends of the rods being pivoted to the said frames by the pivots N, so that when the steering-shaft K is turned the wheels and their boxes and motors will also turn.

It is obvious that a greater or lesser number of my wheel and motor frames may be applied to a vehicle and that the invention may be applied to various forms of vehicles, though I have only shown it on a vehicle designed for heavy work, such as a dray.

Having thus described my invention, what I claim, and desire to secure by Letters Patent, is—

1. In a motor-vehicle, the combination with a wheel and motor carrying frame, of a ground-wheel having a journal on one side mounted in a bearing in the frame, a motor mounted at the opposite side of the frame exterior to the ground-wheel and having its shaft mounted in a bearing in the center of the opposite side of the wheel, and gearing connecting said shaft and wheel.

2. In a motor-vehicle, the combination with a wheel and motor carrying frame, of a ground-wheel journaled therein and having an internally-toothed ring or gear, a motor carried by said frame exterior to said wheel, and having a shaft provided with a pinion concentric with said internally-toothed gear, and a gear carried by the frame and connecting the pinion on the motor-shaft with the first-named gear.

3. In a motor-vehicle, the horizontally-turning frame having a journal-bearing on one side and a motor-box at the other, a wheel having a journal at one side mounted in said bearing and provided at its opposite side with an internal gear, a motor in said box having a shaft extending from its bearings in the box into a central bearing in the wheel, and there provided with a pinion, and pinions carried by the frame and connecting the motor-shaft pinion with the wheel-gear.

4. In a motor-vehicle, a horizontally-turning frame, a ground-wheel journaled therein, a motor mounted on the frame and geared to the wheel, and rollers mounted in the upper portion of the frame and bearing on the upper edge of the wheel.

5. The combination with a vehicle frame or platform, of a plurality of connected horizontally-turning wheel and motor carrying frames, a steering shaft or bar connected to one or more of said frames, a wheel in every frame, and a motor on every frame and geared to the wheel carried thereby.

6. The combination with a platform or body, of two horizontally-turning frames, a vertical steering-shaft geared to said frames for turning them in unison, a wheel mounted in each frame and a motor in each frame and geared to the said wheels.

7. The combination with a platform or body, of two horizontally-turning frames having turn-tables or plates on their upper ends, cover-plates secured to the under side of the platform or body and having bearings in which the axes of the frames turn, roller-bearings between the turn-tables and cover-plates, wheels journaled in said frames, motors for the wheels mounted on said frames, connecting-rods between the frames for moving them in unison, a steering-rod provided at the lower end with a pinion and teeth on two of the said turn-tables with which said pinion meshes.

In testimony whereof I affix my signature in presence of two witnesses.

WILLIAM BOWKER, SR.

Witnesses:
JOS. H. BLACKWOOD,
GEO. H. EVANS.